(12) United States Patent
Smith

(10) Patent No.: US 11,993,986 B1
(45) Date of Patent: May 28, 2024

(54) SYSTEM, METHOD AND APPARATUS FOR A PROTECTION CLAMP FOR PIPE

(71) Applicant: Alaskan Energy Resources, Inc., Anchorage, AK (US)

(72) Inventor: Lee Morgan Smith, Anchorage, AK (US)

(73) Assignee: ALASKAN ENERGY RESOURCES, INC., Anchorage, AK (US)

( * ) Notice: Subject to any disclaimer, the term of this patent is extended or adjusted under 35 U.S.C. 154(b) by 0 days.

(21) Appl. No.: 18/098,472

(22) Filed: Jan. 18, 2023

(51) Int. Cl.
*E21B 17/10* (2006.01)
*F16L 57/02* (2006.01)

(52) U.S. Cl.
CPC .......... *E21B 17/1085* (2013.01); *F16L 57/02* (2013.01)

(58) Field of Classification Search
CPC ....... E21B 17/1085; F16L 57/02; F16L 57/06; F16L 57/00
See application file for complete search history.

(56) References Cited

U.S. PATENT DOCUMENTS

| | | | | |
|---|---|---|---|---|
| 4,081,203 A * | 3/1978 | Fuller | ................. | E21B 10/5676 175/325.4 |
| 4,199,011 A * | 4/1980 | Kreft | ..................... | E21B 17/105 138/158 |
| 4,296,973 A * | 10/1981 | Hartwell | ................. | E21B 10/56 175/325.4 |
| 4,602,690 A * | 7/1986 | Steiger | .................... | E21B 31/00 175/325.6 |
| 4,796,670 A * | 1/1989 | Russell | ................. | E21B 17/105 138/108 |
| 5,803,193 A * | 9/1998 | Krueger | .............. | E21B 17/1064 175/325.1 |
| 5,806,615 A * | 9/1998 | Appleton | ............ | E21B 17/1078 138/110 |
| 6,023,027 A * | 2/2000 | Neff | ..................... | E21B 17/1035 174/136 |
| 6,058,475 A * | 5/2000 | McDonald | ............ | G06F 15/177 714/36 |
| 6,209,667 B1 * | 4/2001 | Murray | ............... | E21B 17/1057 175/325.5 |
| 6,250,406 B1 * | 6/2001 | Luke | ..................... | E21B 17/105 175/325.2 |

(Continued)

FOREIGN PATENT DOCUMENTS

CA 2677345 1/2013

OTHER PUBLICATIONS

Website, https://oilstates.com/onshore-marine-industrial-solutions/onshore/well-servicing-products/drill-pipe-casing-protector/, copyright 2023 Oil States Industries.

(Continued)

*Primary Examiner* — Taras P Bemko
(74) *Attorney, Agent, or Firm* — Dickinson Wright PLLC

(57) ABSTRACT

A clamp for a downhole tool includes a sleeve having an axis and sleeve bodies. The sleeve bodies are coupled together on a first side of the clamp. Fasteners are used to mechanically lock the sleeve bodies together on a second side of the clamp to surround and clamp onto an exterior of a drill string having pipes. The pipes are coupled together at their coupled connections. In addition, recesses are formed in an exterior of each sleeve body. Inserts are mounted in the recesses to provide low friction exterior surfaces for the clamp.

27 Claims, 11 Drawing Sheets

(56) References Cited

U.S. PATENT DOCUMENTS

| | | | |
|---|---|---|---|
| 6,688,409 B1* | 2/2004 | Murray | E21B 17/1057 |
| | | | 166/241.1 |
| 6,845,816 B2* | 1/2005 | Kirk | E21B 17/1078 |
| | | | 175/325.1 |
| 8,640,770 B1 | 2/2014 | Smith et al. | |
| 8,739,865 B1 | 6/2014 | Smith et al. | |
| 9,267,352 B1 | 2/2016 | Smith | |
| 9,328,566 B1 | 5/2016 | Smith et al. | |
| 10,053,925 B1* | 8/2018 | Smith | E21B 17/1078 |
| 10,364,619 B2* | 7/2019 | Smith | E21B 17/1078 |
| 2008/0217063 A1* | 9/2008 | Moore | E21B 17/12 |
| | | | 175/57 |
| 2010/0276138 A1* | 11/2010 | Wittman | E21B 17/1057 |
| | | | 166/241.1 |
| 2012/0255744 A1* | 10/2012 | Shaikh | E21B 17/1057 |
| | | | 166/241.1 |
| 2015/0292270 A1* | 10/2015 | Zhang | C22C 26/00 |
| | | | 51/307 |
| 2019/0040693 A1* | 2/2019 | Smith | E21B 17/1057 |
| 2019/0301536 A1* | 10/2019 | Meier | F16C 33/043 |
| 2019/0338602 A1* | 11/2019 | Budler | E21B 17/1078 |
| 2020/0378440 A1* | 12/2020 | Prevost | F16C 33/043 |
| 2021/0079740 A1* | 3/2021 | Baynham | E21B 17/1064 |
| 2021/0131196 A1* | 5/2021 | Al-Qasim | E21B 17/1057 |
| 2023/0064436 A1* | 3/2023 | Lovelace | E21B 10/5673 |
| 2023/0087579 A1* | 3/2023 | Banks | E21B 17/1007 |
| | | | 166/382 |

OTHER PUBLICATIONS

Website, https://www.wwtco.com/products/wwt-non-rotating-protectors , copyright 2023 WWT International | Drilling Torque Reducing Toos | Coil Tubing Tractors. All Rights Reserved. Development by: Houston Website Design.

* cited by examiner

SYSTEM, METHOD AND APPARATUS FOR A PROTECTION CLAMP FOR PIPE

CROSS-REFERENCE TO RELATED APPLICATION

None.

BACKGROUND

Field of the Disclosure

The present disclosure relates in general to downhole tools and, in particular, to a clamp for a downhole tool.

Description of the Prior Art

Conventional downhole drill strings include numerous joints of pipe that are threaded together to support a bottom hole assembly (BHA) for drilling a well in an earthen formation. The BHA can include a drill bit on drill pipes that joined together at their coupled connections. During operation downhole, the coupled connections impact with the casing and the open hole of the well below the casing. Such impacts can damage the casing and the coupled connections. Products have been proposed to protect the casing and coupled connections during use. For example, a steel-reinforced, molded rubber pad is described at https://oilstates-.com/onshore-marine-industrial-solutions/onshore/well-servicing-products/drill-pipe-casing-protector/. Unfortunately, such existing products perform only within the well casing; they cannot operate in the open hole below the casing due to limitations on its elastomeric or polymer main body. Additionally, the evolution of well designs have created large sections of hole outside of the casing. For example, it is now not uncommon to drill horizontal laterals that are 20,000 to 40,000 feet outside of the casing. Although some conventional solutions are somewhat workable, improvements in protecting downhole tools continue to be of interest.

SUMMARY

Embodiments of a system, method and apparatus for a clamp for a downhole tool are disclosed. For example, the clamp can include a sleeve having an axis and sleeve bodies. The sleeve bodies are coupled together on a first side of the clamp. Fasteners are used to mechanically lock the sleeve bodies together on a second side of the clamp to surround and clamp onto an exterior of a drill string having pipes. The pipes are coupled together at their coupled connections which have a larger outer diameter than the "tube" or main lengths of the pipes. In addition, recesses are formed in an exterior of each sleeve body. Inserts are mounted in the recesses to provide low friction exterior surfaces for the clamp. Additionally, these inserts provide enhanced abrasion resistance which protects the connections.

BRIEF DESCRIPTION OF THE DRAWINGS

Before one or more embodiments are described in detail, one skilled in the art will appreciate that they are not limited in its application to the details of construction, the arrangements of components, and the arrangement of steps set forth in the following detailed description or illustrated in the drawings and descriptions. Rather, they are capable of other embodiments and of being practiced or being carried out in various ways. Also, it is to be understood that the phraseology and terminology used herein is for the purpose of description and should not be regarded as limiting.

DETAILED DESCRIPTION

Referring to FIGS. 1-11, the following descriptions of various implementations of the present teachings have been presented for purposes of illustration and description. It is not exhaustive and does not limit the present teachings to the precise form disclosed. Modifications and variations are possible in light of the above teachings or may be acquired from practicing the present teachings.

Figure 1:
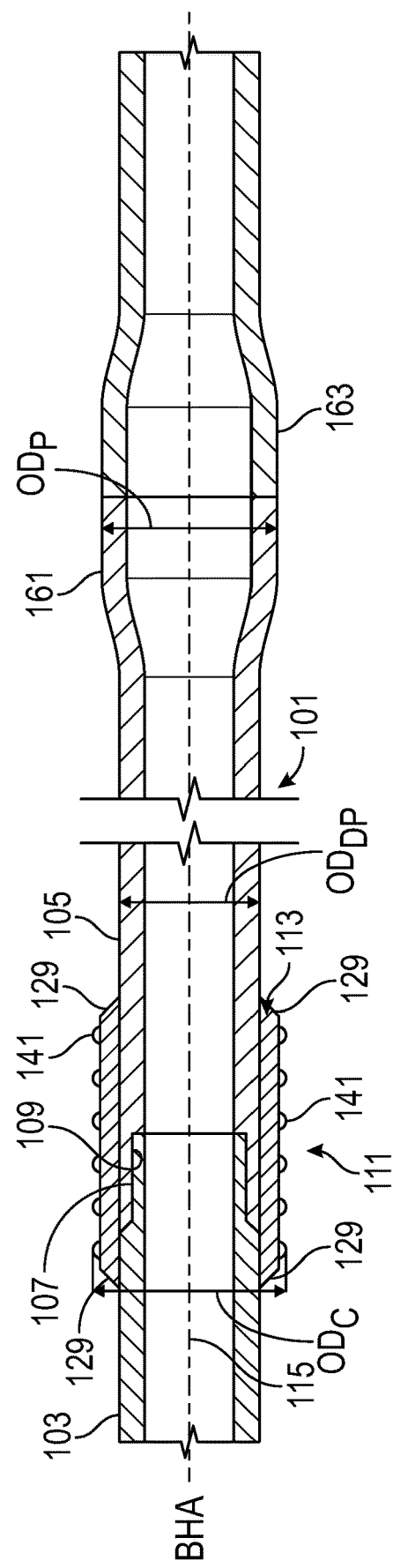
FIG. 1 is a partially sectional view of an embodiment of a clamp installed on drill pipes.
Figure 2:
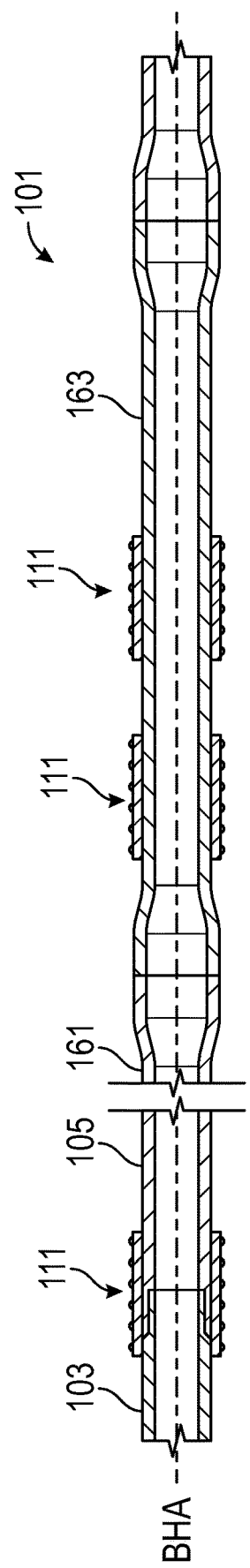
FIG. 2 is an elongated, partially sectional view of another embodiment of clamps installed on drill pipes.
Figure 3:
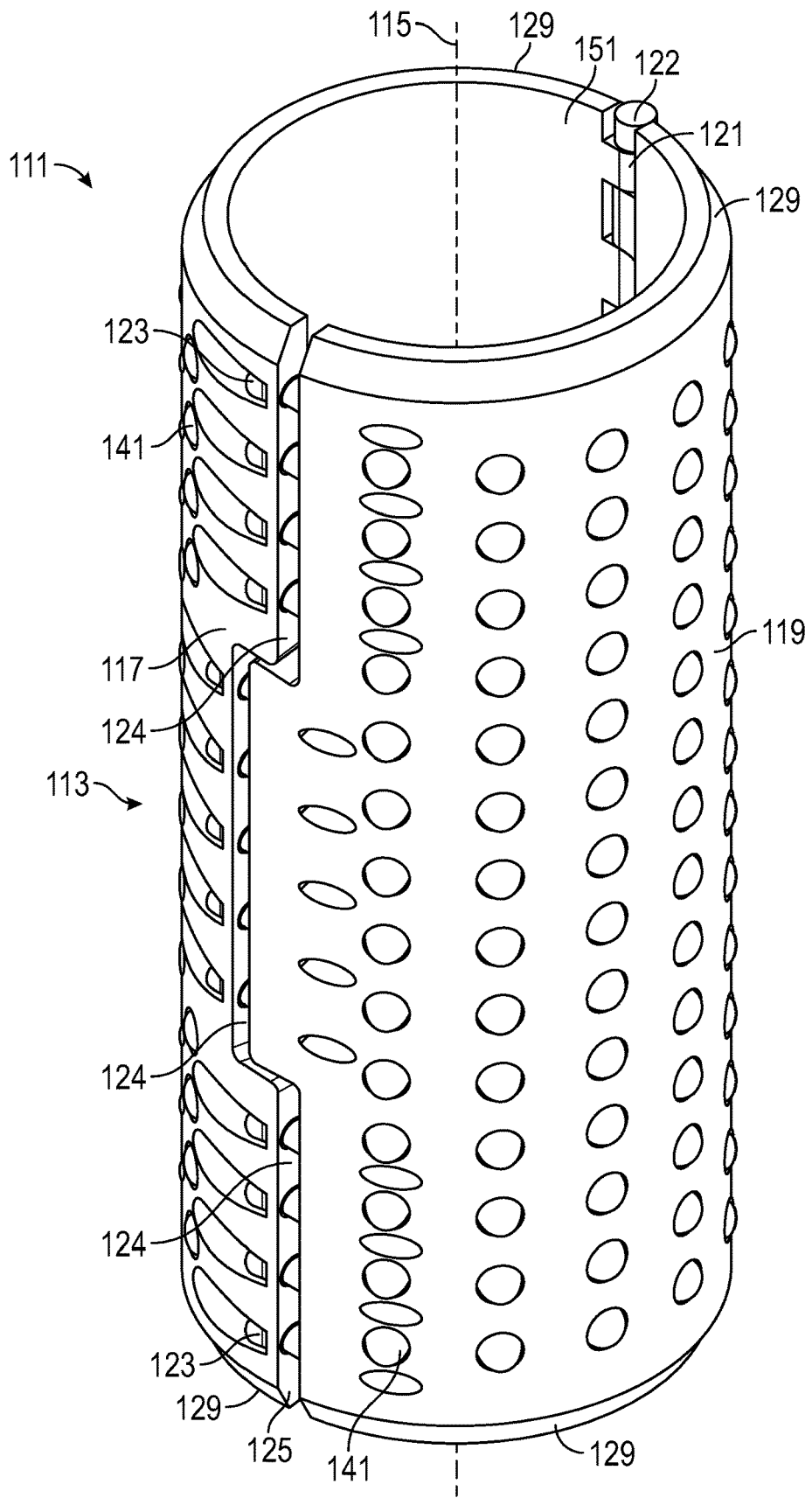
FIG. 3 is a perspective view of an embodiment of the clamp.

Embodiments of a system, method and apparatus for a clamp 111 for a downhole tool 101 (see FIGS. 1 and 2 (not to scale), e.g., a drill string) are disclosed. For example, the clamp 111 can include a sleeve 113 having an axis 115 (FIG. 3) and sleeve bodies 117, 119 coupled together on a first side 121. The sleeve bodies 117, 119 can be pivotally coupled together via a hinge 122 (FIGS. 3 and 5), in some versions. Each sleeve body 117, 119 can have a radial thickness (transverse to axis 115) that is a percentage of the overall axial length of clamp 111.

Fasteners 123 can be used to mechanically lock the sleeve bodies 117, 119 together on a second side 125 to surround and clamp onto an exterior of the downhole tool 101. In some versions, the first side 121 and the second side 125 can be located opposite of each other. Embodiments of the sleeve bodies 117, 119 can consist of metal and do not comprise a polymer or elastomer. In another example, the sleeve bodies 117, 119 can comprise ceramic.

Figure 4:
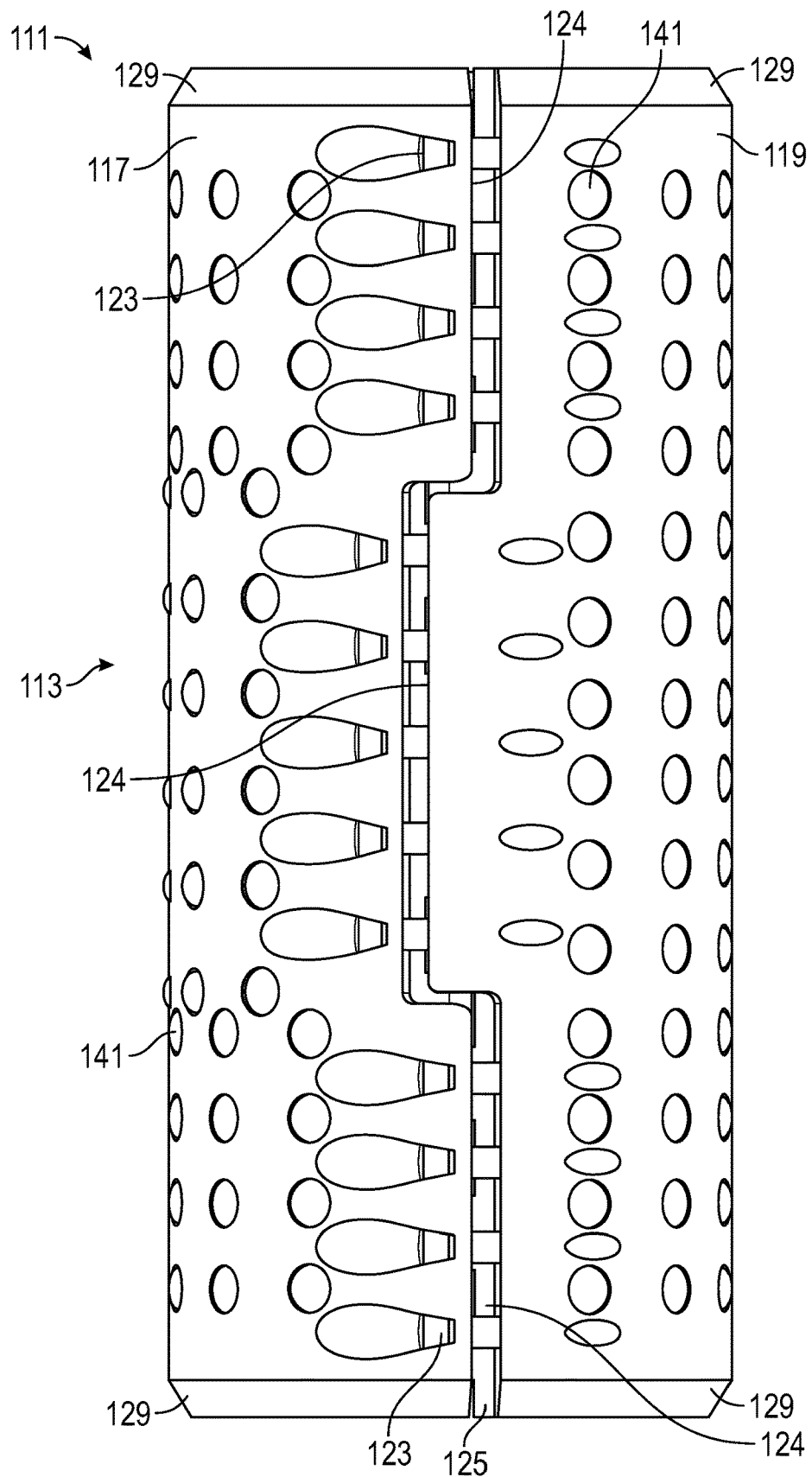
FIG. 4 is a front view of the clamp of FIG. 3.
Figure 5:
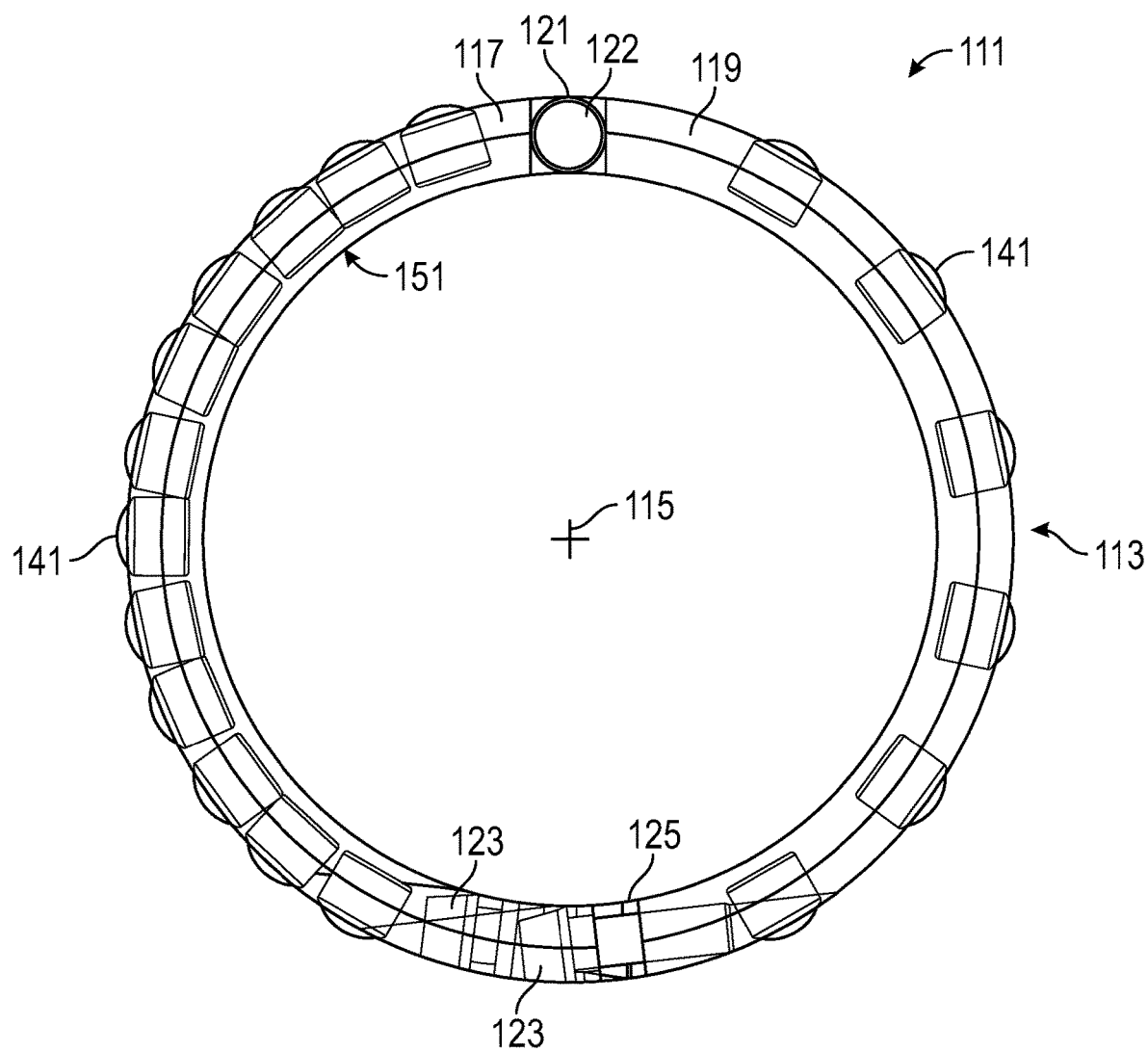
FIG. 5 is a partial sectional top view of the clamp of FIG. 3.

Versions of the clamp 111 can further include tapered axial ends 129, such as on each axial end of each of the sleeve bodies 117, 119. The tapered axial ends are sloped or beveled to a smaller diameter than the largest outside diameter of the sleeve bodies 117, 119. As shown in FIG. 4, examples of the tapered axial ends 129 can be flush with the pin or rod that is used to form the hinge 122. In some examples, the tapered axial ends 129 can include a ramp angle in a range of about 10 degrees to about 65 degrees. In other examples, the tapered axial ends 129 can comprise a percentage of the overall axial length of the clamp 111, such as about 5% to about 65%.

Embodiments of clamp 111 also can have castellations 124 (FIGS. 3 and 4) that are complementary in shape. For example, sleeve body 117 is shown with two outer castellations that matingly receive a single inner castellation 124 on sleeve body 119. Although the castellations 124 are depicted with a generally rectangular shapes, other shapes also may be employed. Smaller and more numerous castellations can be located on the opposite side of the clamp 111.

The downhole tool 101 can include drill pipes 103, 105 with coupled connections 107, 109, respectively. In some embodiments, an outer diameter of the drill pipes 103, 105 can be the same or substantially the same diameter as the coupled connections 107, 109, such that the drill pipes have a consistent outer diameter from end to end. Each drill pipe 103, 105 can include its own male and female threaded connections, as is known in the art. The outer diameter of the drill pipes 103, 105, is less than an inner diameter of the clamp 111. In some versions, the sleeve 113 can axially overlap the coupled connections 107, 109, as shown. Examples of the sleeve 113 can entirely axially overlap the coupled connections 107, 109. However, the sleeve 113 does not add any axial length to the downhole tool 101 or drill string, but surrounds only a portion of it. The clamp 111 can be clamped onto the coupled connections 107, 109 and drill pipes 103, 105, or simply adjacent to the coupled connections 107, 109, as shown on the right side of FIG. 2. The clamp 111 can frictionally engage the coupled connections 107, 109 such that it does not move axially or rotationally with respect to the coupled connections 107, 109 during operation, in some versions.

The downhole tool 101 can further include conventional joints of pipe 161, 163 (with pin and box connections) above and coupled to the drill pipes 103, 105, and a bottom hole assembly (BHA) below and coupled to the drill pipes 103, 105. In FIG. 1, one clamp 111 is shown on the downhole tool 101, where the outer diameter of the clamp 111 ($OD_C$) is greater than the outer diameter of the pipe ($OD_P$) 161, 163, which is greater than the outer diameter of the drill pipes ($OD_{OP}$) 103, 105. In FIG. 2, three clamps 111 are shown installed on the downhole tool 101. One clamp 111 is in the same position as in FIG. 1, a second clamp 111 is located near a pin and box connection of pipes 161, 163, and a third clamp 111 is located at or near the middle of pipe 163 to help it not buckle when under load.

Figure 6:
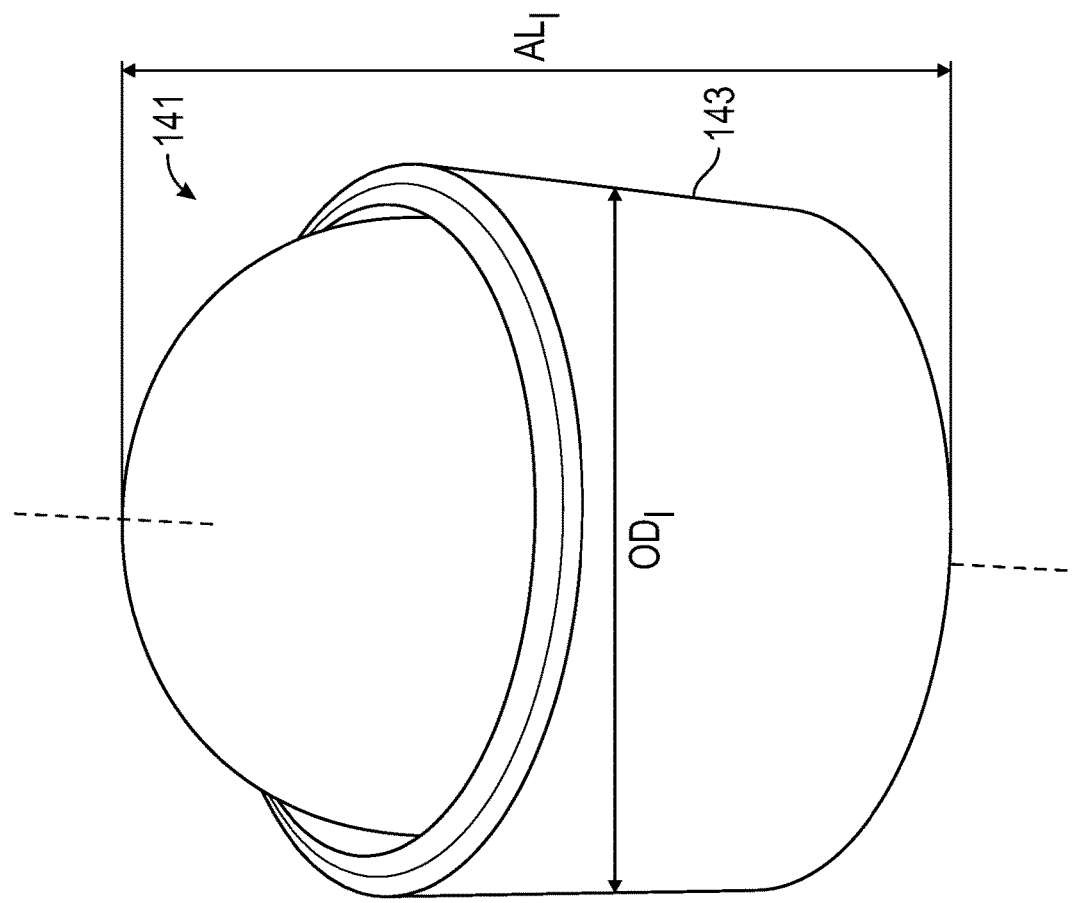
FIG. 6 is an isometric view of an embodiment of an insert.

Embodiments of the clamp 111 can include a plurality of recesses 131 or pockets that are formed in an exterior of each sleeve body 117, 119. Inserts 141 can be attached to or mounted in the recesses 131 to provide low friction exterior surfaces for the clamp 111, in some examples. As shown in FIG. 6, versions of the inserts 141 can comprise at least one of polycrystalline diamond compacts (PDC), impregnated diamond, tungsten carbide or ceramic. At least some of the PDC can be "polished." In another embodiment, at least some of the PDC are domed solids. In still another embodiment, at least some of the PDC are semi-spherical. At least some of the PDC can each be mounted in respective steel rings 143, in some examples. Moreover, the PDC can be in compression via the respective steel rings 143. The PDC can be thermally stable and comprise a ceramic phase binder.

In some embodiments (e.g., FIG. 3), the inserts 141 can be symmetrically arrayed about the sleeve 113. In other embodiments, (e.g., FIGS. 4-5), at least some of the inserts 141 are not symmetrically arrayed about the clamp 111, having more inserts 141 on one of the sleeve bodies 117 than on the other of the sleeve bodies 119. In one non-symmetrical embodiment, the sleeve 113 can have a higher density of the inserts 141 on one of the sleeve bodies 117 than on the other of the sleeve bodies 119. Collectively, the inserts 141 can form rows and columns about the clamp 111. In some examples, each insert 141 can comprise an outer diameter $OD_I$ (FIG. 6, which includes the diameter of the steel ring 143) in a range of 0.2 inches to 1.5 inches. In other examples, each insert 141 can comprise a main axial length $AL_I$ in a range of 0.2 inches to 1.5 inches. The inserts 141 can protrude beyond an exterior surface of the sleeve 113 in a range of 0 inches (i.e., flush with the exterior of the sleeve 113) to ½ inches.

Other embodiments of the clamp 111 can have an interior surface 151 (FIGS. 3 and 5) that comprise a lower friction surface than other portions of the clamp 111. The lower friction surface can reduce friction between the clamp 111 and the coupled connections 107, 109 (e.g., FIG. 1) and permit some relative axial and/or rotational movement between the clamp 111 and the coupled connections 107, 109. For example, the lower friction surface can comprise PDC.

Figure 7:
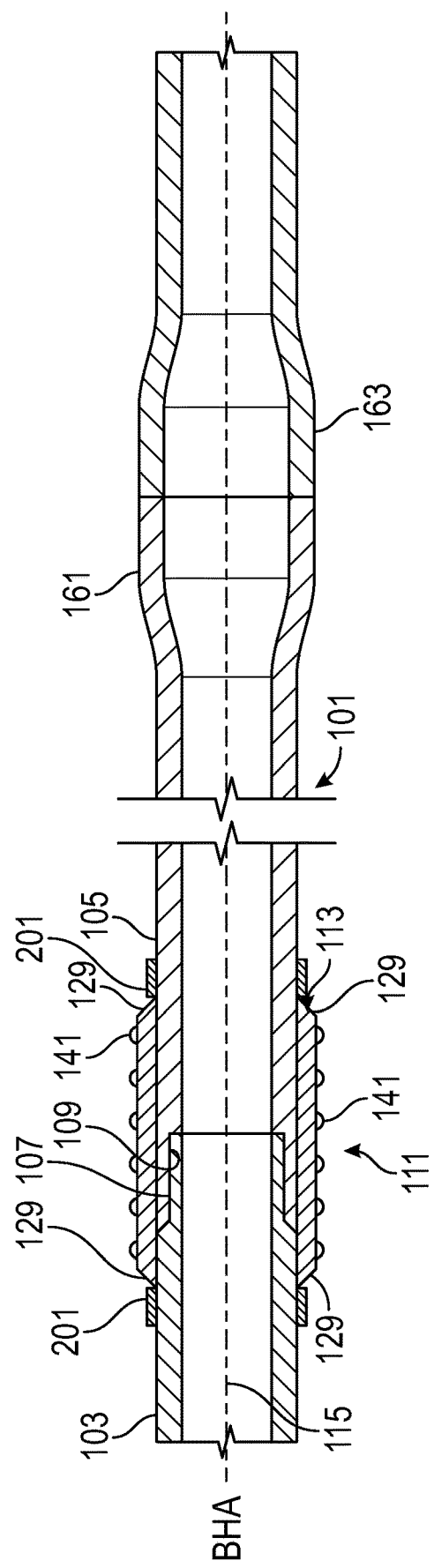
FIG. 7 is a partially sectional view of another embodiment of a clamp installed on drill pipes.
Figure 8:
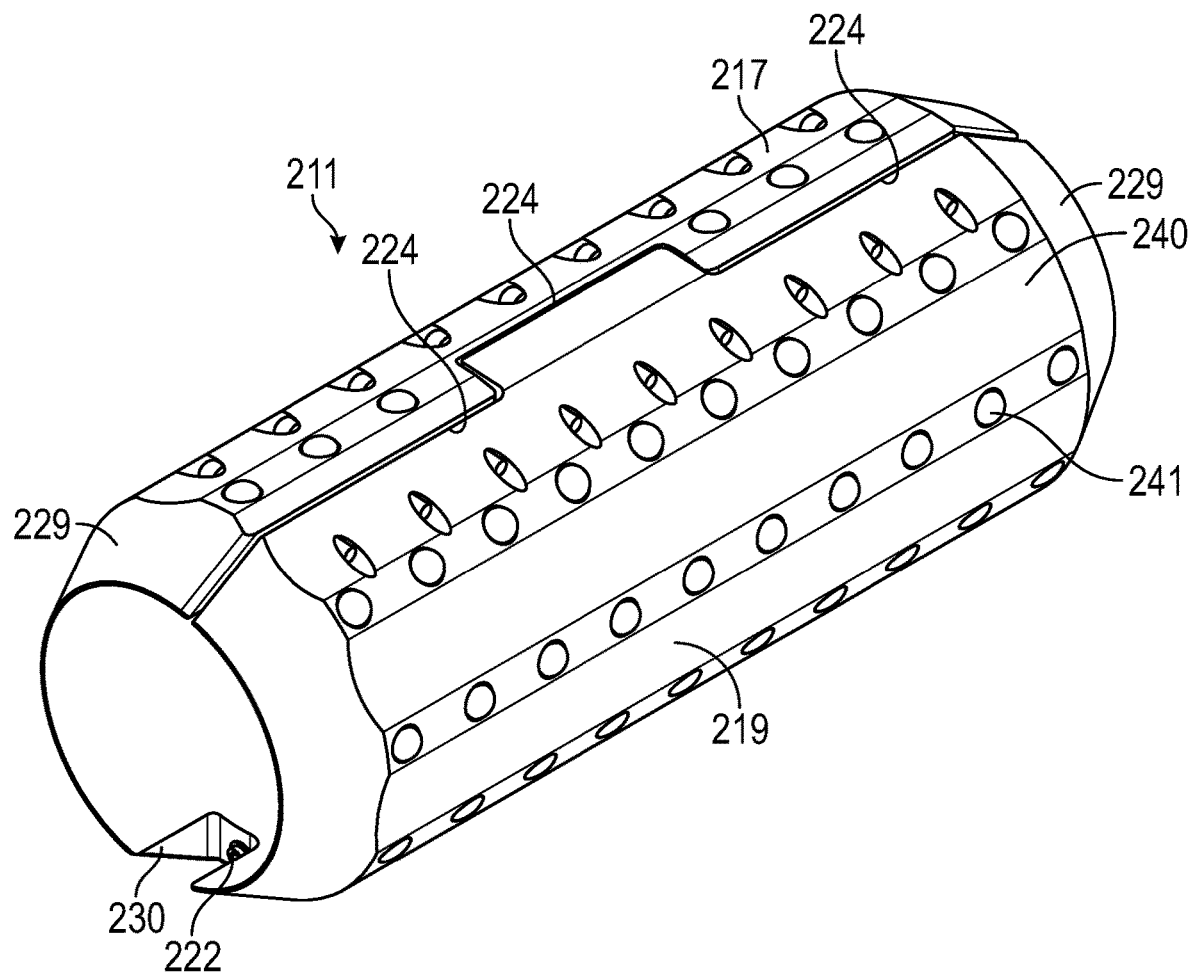
FIG. 8 is an isometric view of an additional embodiment of a clamp in a closed position.
Figure 9:
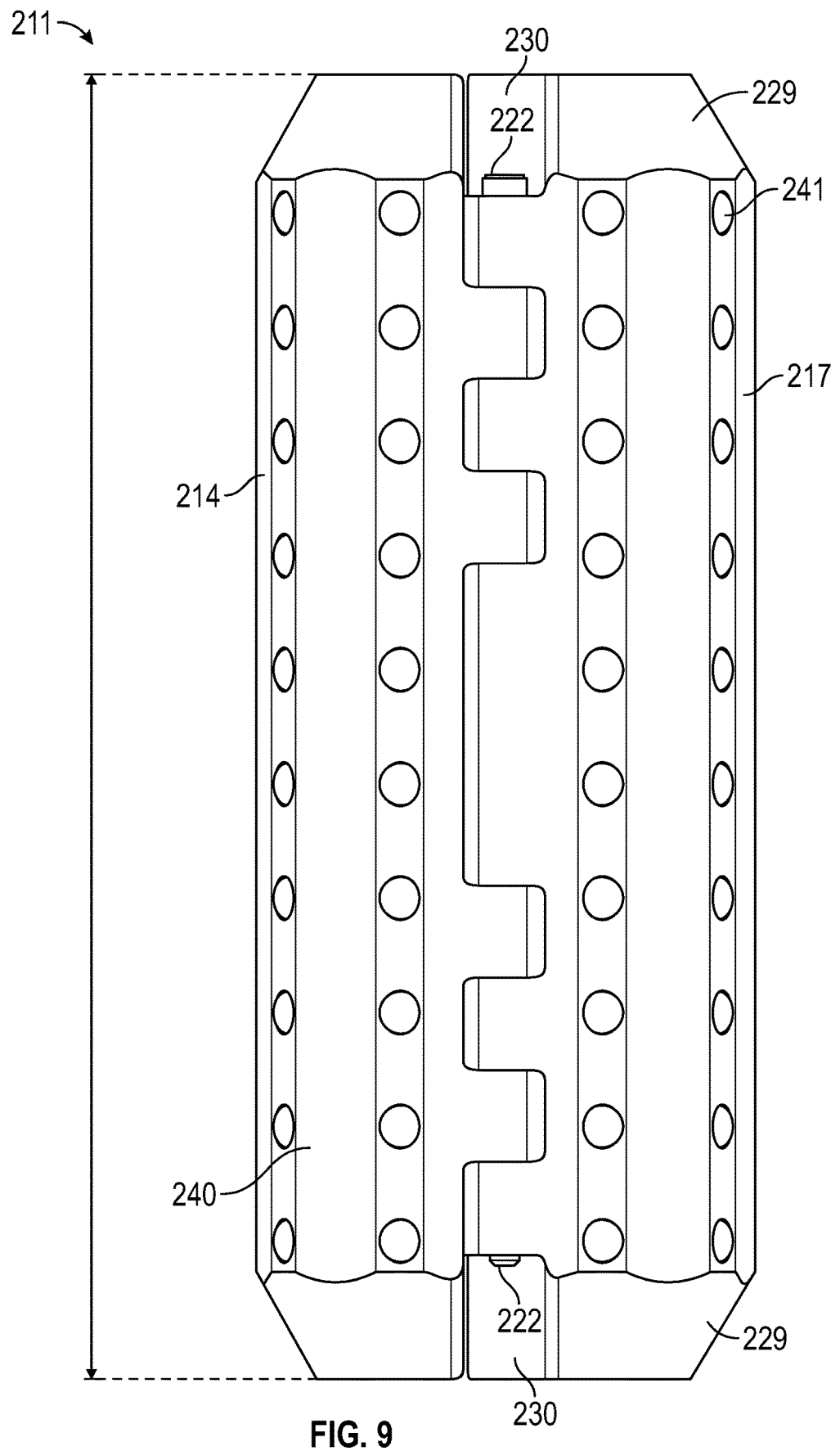
FIG. 9 is a side view of the clamp of FIG. 8.
Figure 10:
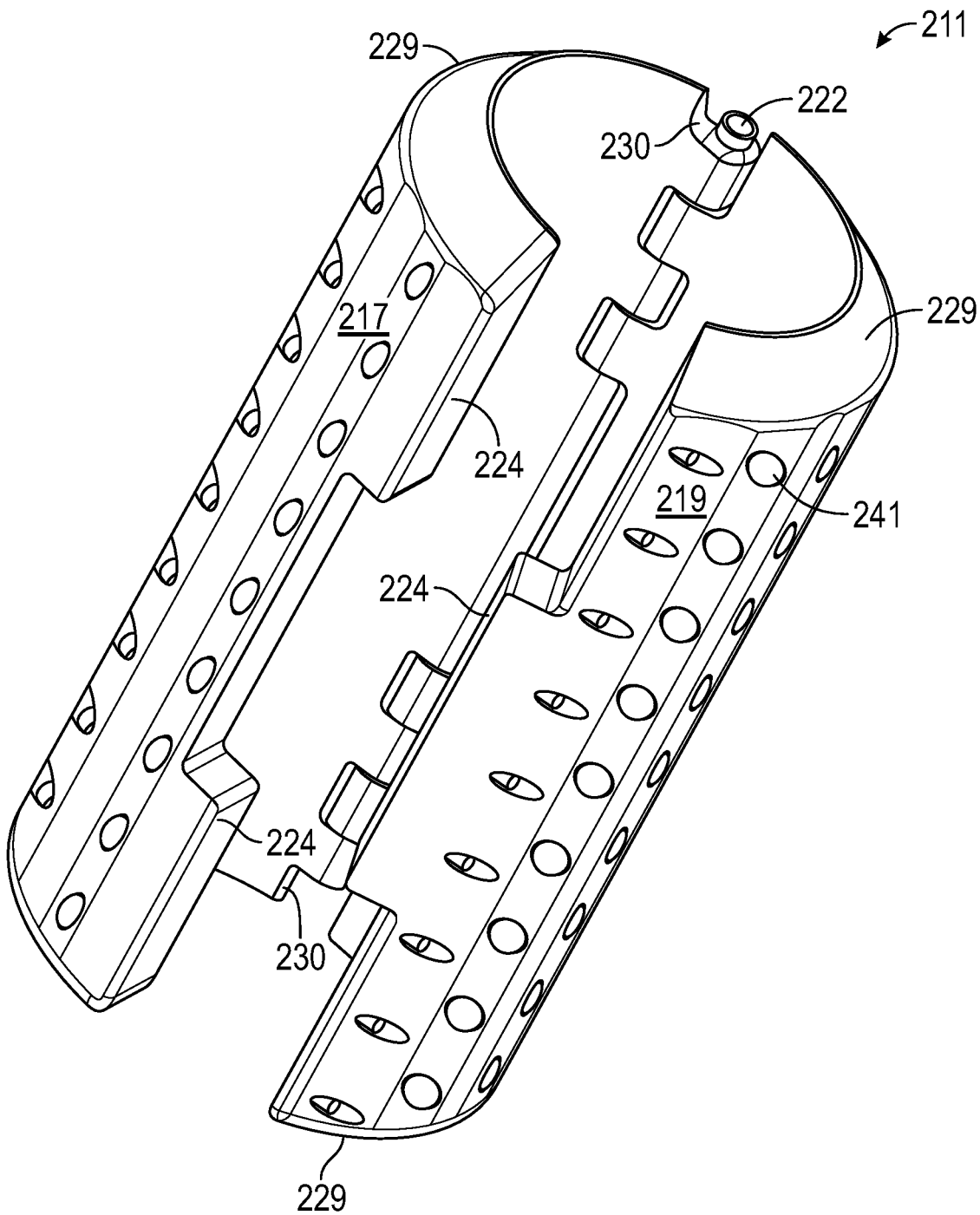
FIG. 10 is an isometric view of the clamp of FIG. 8 in an open position.

FIG. 7 depicts an embodiment with end rings 201. The end rings 201 can be hinged, similar to clamp 111, and then bolted in place to secure the clamp 111, which can be free to rotate in this version. The end rings 201 can prevent the clamp 111 from moving axially. Examples of the end rings 201 can be found in the following patents, U.S. Pat. Nos. 8,640,770, 8,739,865, 9,267,352 and 9,328,566, each of which is incorporated herein by reference in its entirety.

The embodiments disclosed herein differ from conventional solutions. For example, the clamp 111 does not comprise ball bearings. Moreover, the inserts 141 do not comprise diamond carbide composite or tungsten carbide. In other example, the clamp 111 does not comprise an inclined ramp, other than at axial ends (i.e., the tips) thereof, and the clamp 111 does not comprise cutters or outer wear bands. In other versions, the clamp 111 does not comprise axial flutes or grooves in the sleeve bodies 117, 119 between the inserts 141, and the clamp 111 is not threaded.

FIGS. 8-11 depict another embodiment of a clamp 211. Clamp 211 can share many of the same features as clamp 111. Clamp 211 can further include larger tapered axial ends 229 than tapered axial ends 129. The tapered axial ends 229 can be larger and/or axially longer than tapered axial ends 129. Examples of the tapered axial ends 229 can include a recess 230 so they are not flush with the pin or rod that is used to form the hinge 222. In other words, the pin or rod for hinge 222 can be axially shorter than the axial length of one or both of the sleeve bodies 217, 219.

Figure 11:
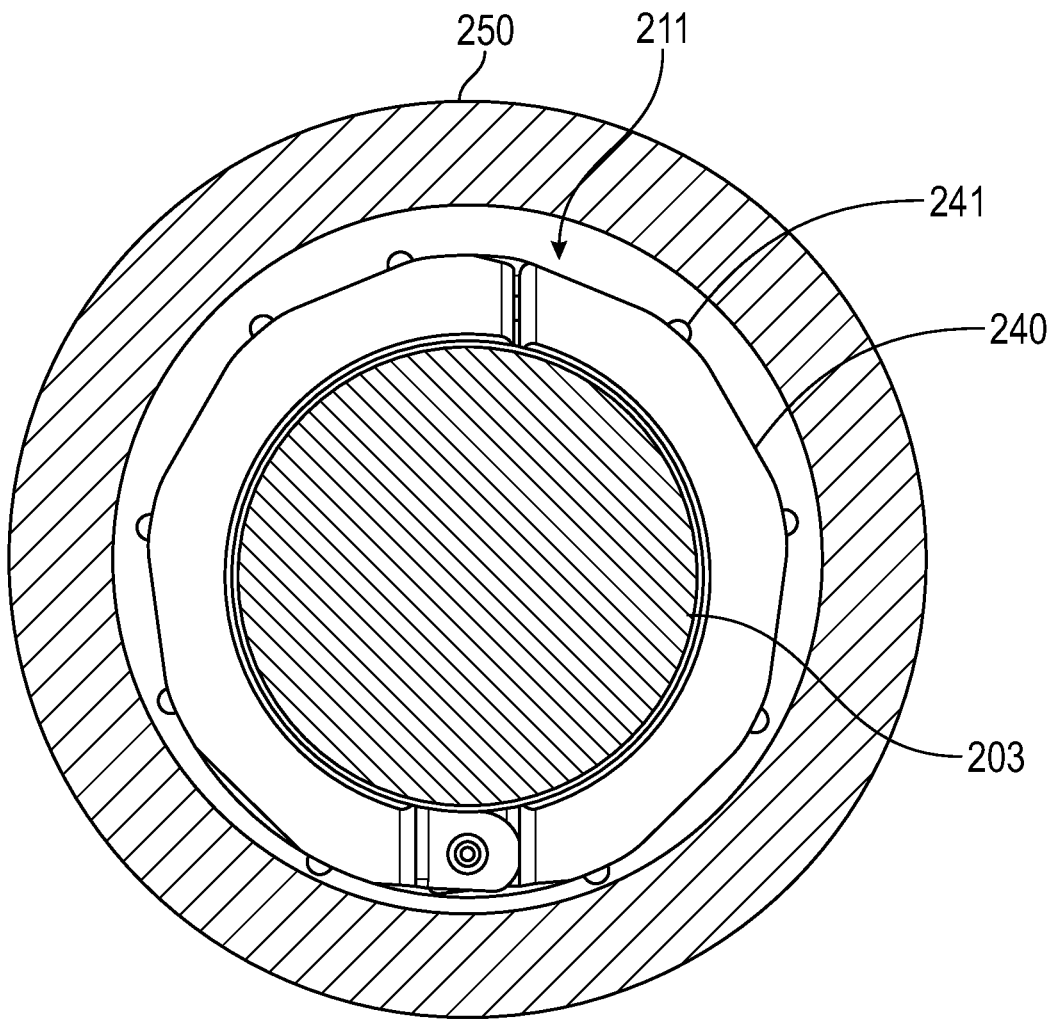
FIG. 11 is a schematic sectional view of the clamp of FIG. 8 clamped to a drill pipe and located inside wellbore casing.

Clamp 111 has an overall cylindrical or substantially cylindrical shape. Although clamp 211 also has a substantially cylindrical shape, it also can include longitudinal portions 240 that can be flat or slightly concave in shape. The longitudinal portions 240 can be cut or milled as shallow grooves or troughs between the rows of inserts 241, as an illustration. In some versions, the longitudinal portions 241 can help facilitate drilling fluid flow, such as in small bore holes where the clamp 211 is larger than the drill pipe connections. For example, FIG. 11 depicts clamp 211 mounted on drill pipe 203 and located inside wellbore casing 250, as it might appear in operation.

These designs reduce pipe connection wear and tear, as well as reduce wear inside the well casing. They are robust enough to perform for extended hours out into the open hole of the well. The designs do not add any length to drill pipe stands, and are easy to change out on the rig floor versus breaking out pipe and taking across location to a hard banding unit. In its simplest form, this tool has no moving parts (once assembled) and has proven PDC protection. The use of polished PDC or a dome-type material can result in a tool running for hundreds of hours with minimal wear. Versions of the tool have no internal ball bearings or other bearings, which extends the life of the tool. In addition, the inserts provide a significant torque reduction (when the drill string 101 is in operation) compared to conventional solutions formed from steel or polymers.

The insert for the tool can include solid polycrystalline diamond dome with a steel compression ring reinforcement having a diameter of about 13 mm to about 16 mm, in some versions. The diamond is thermally stable with a ceramic phase binder. The steel ring puts the diamond into compression which makes it stronger and more resistant to cracking. It also provides a cushion and forgiveness in the pocket for any small point loading tendencies if it is press fit into the tool pocket. The wear element is slightly less abrasion-resistant than PDC cutter diamond, but has higher abrasion resistance than tungsten carbide. It can be used as a depth of cut limiter to replace traditional diamond matrix or carbide. In addition, it is less expensive than diamond carbide composite domes. Diamond also has a lower friction factor against rock than tungsten carbide, which can translate into better tool face control and less energy loss to the bit.

Still other embodiments can include one or more of the following items.

1. A clamp for a downhole tool, the clamp comprising:
  a sleeve having an axis and sleeve bodies coupled together on a first side, fasteners to mechanically lock the sleeve bodies together on a second side to surround and clamp onto an exterior of a drill string having drill pipes with coupled connections such that the sleeve axially overlaps the connections, and a plurality of recesses formed in an exterior of each sleeve body; and
  inserts mounted in the recesses to provide low friction exterior surfaces for the clamp.
2. The clamp wherein the sleeve entirely axially overlaps the coupled connections.
3. The clamp wherein the sleeve does not add any axial length to the drill string, but surrounds only a portion of the drill string.
4. The clamp wherein the sleeve bodies are pivotally coupled together via a hinge.
5. The clamp wherein the sleeve bodies consist of metal and do not comprise a polymer or elastomer.
6. The clamp wherein the sleeve bodies comprise ceramic.
7. The clamp wherein, when the clamp is clamped onto the coupled connections, the clamp frictionally engages the coupled connections and does not move axially or rotationally with respect to the coupled connections during operation.
8. The clamp wherein the inserts comprise at least one of polycrystalline diamond compacts (PDC), impregnated diamond, tungsten carbide or ceramic.
9. The clamp wherein the PDC are polished.
10. The clamp wherein at least some of the PDC are domed solids.
11. The clamp wherein at least some of the PDC are semi-spherical.
12. The clamp wherein at least some of the PDC are each mounted in respective steel rings.
13. The clamp wherein the PDC are in compression via respective steel rings.
14. The clamp wherein the PDC are thermally stable and comprise a ceramic phase binder.
15. The clamp wherein the PDC are symmetrically arrayed about the sleeve.
16. The clamp wherein the PDC are not symmetrically arrayed about the clamp, having more PDC on one of the sleeve bodies than on the other of the sleeve bodies.
17. The clamp wherein the PDC are not symmetrically arrayed about the sleeve, such that the sleeve has a higher density of PDC on one of the sleeve bodies than on the other of the sleeve bodies.
18. The clamp wherein the PDC form rows and columns about the clamp.
19. The clamp wherein each PDC comprises a diameter in a range of 0.2 inches to 1.5 inches.
20. The clamp wherein each PDC comprises a main axial length in a range of 0.2 inches to 1.5 inches.
21. The clamp wherein the PDC protrude beyond an exterior surface of the sleeve in a range of 0 inches to ½ inches.
22. The clamp wherein an interior surface of the clamp comprises a lower friction surface than other portions of the clamp to reduce friction between the clamp and the coupled connections and permit relative axial and/or rotational movement between the clamp and the coupled connections.
23. The clamp wherein the lower friction surface comprises PDC.
24. The clamp wherein:
  the clamp does not comprise ball bearings; and
  the inserts do not comprise diamond carbide composite nor tungsten carbide.
25. The clamp wherein:
  the clamp does not comprise an inclined ramp, other than at axial ends thereof;
  the clamp does not comprise cutters or outer wear bands;
  the clamp does not comprise axial flutes or grooves in the sleeve bodies between the inserts; and
  the clamp is not threaded.
26. The clamp wherein each sleeve body comprises tapered axial ends.
27. The clamp wherein the tapered axial ends comprise a recess so that ends of the tapered axial ends are not flush with a rod that is used to form a hinge between the sleeve bodies.
28. The clamp wherein the clamp comprises a cylindrical shape, each sleeve body comprises longitudinal portions that are flat or concave in shape, and the longitudinal portions are located between respective rows of the inserts.
29. A clamp for a downhole tool, the clamp comprising:
  a sleeve having an axis and sleeve bodies pivotally coupled together via a hinge on a first side, fasteners to mechanically lock the sleeve bodies together on a second side opposite the hinge to surround and clamp onto an exterior of a drill string having drill pipes with coupled connections such that the sleeve axially overlaps the coupled connections, and a plurality of recesses formed in an exterior of each sleeve body; and
  inserts mounted in the recesses to provide low friction exterior surfaces for the clamp.
30. A clamp for a downhole tool, the clamp comprising:
  a sleeve having an axis and sleeve bodies coupled together to mechanically lock the sleeve bodies together to surround and clamp onto an exterior of a drill string having drill pipes with coupled connections such that the sleeve axially overlaps the coupled connections; and
  protrusions extending from the sleeve to provide low friction exterior surfaces for the clamp.
  A clamp for a downhole tool, the clamp comprising:
  a sleeve having an axis and sleeve bodies coupled together on a first side, fasteners to mechanically lock the sleeve bodies together on a second side to surround and clamp onto an exterior of a drill string having pipes adjacent to coupled connections of the pipes, and a plurality of recesses formed in an exterior of each sleeve body; and inserts mounted in the recesses to provide low friction exterior surfaces for the clamp.

The clamp wherein the sleeve does not add any axial length to the drill string, but surrounds only a portion of the drill string.

The clamp wherein the sleeve bodies are pivotally coupled together via a hinge.

The clamp wherein the sleeve bodies consist of metal and do not comprise a polymer or elastomer.

The clamp wherein the sleeve bodies comprise ceramic.

The clamp wherein, when the clamp is clamped onto the drill string, the clamp frictionally engages the drill string and does not move axially or rotationally with respect to the drill string during operation.

The clamp wherein the inserts comprise at least one of polycrystalline diamond compacts (PDC), impregnated diamond, tungsten carbide or ceramic.

The clamp wherein the PDC are polished.

The clamp wherein at least some of the PDC are domed solids.

The clamp wherein at least some of the PDC are semi-spherical.

The clamp wherein at least some of the PDC are each mounted in respective steel rings.

The clamp wherein the PDC are in compression via respective steel rings.

The clamp wherein the PDC are thermally stable and comprise a ceramic phase binder.

The clamp wherein the PDC are symmetrically arrayed about the sleeve.

The clamp wherein the PDC are not symmetrically arrayed about the clamp, having more PDC on one of the sleeve bodies than on the other of the sleeve bodies.

The clamp wherein the PDC are not symmetrically arrayed about the sleeve, such that the sleeve has a higher density of PDC on one of the sleeve bodies than on the other of the sleeve bodies.

The clamp wherein the PDC form rows and columns about the clamp.

The clamp wherein each PDC comprises a diameter in a range of 0.2 inches to ¾ inches.

The clamp wherein each PDC comprises a main axial length in a range of 0.2 inches to 1.5 inches.

The clamp wherein the PDC protrude beyond an exterior surface of the sleeve in a range of 0 inches to ½ inch.

The clamp wherein an interior surface of the clamp comprises a lower friction surface than other portions of the clamp to reduce friction between the clamp and the drill string and permit relative axial and/or rotational movement between the clamp and the drill string.

The clamp wherein the lower friction surface comprises PDC.

The clamp wherein:
the clamp does not comprise ball bearings; and
the inserts do not comprise diamond carbide composite nor tungsten carbide.

The clamp wherein:
the clamp does not comprise an inclined ramp, other than at axial ends thereof;
the clamp does not comprise cutters or outer wear bands;
the clamp does not comprise axial flutes or grooves in the sleeve bodies between the inserts; and
the clamp is not threaded.

The clamp wherein each sleeve body comprises tapered axial ends.

The clamp wherein the tapered axial ends comprise a recess so that ends of the tapered axial ends are not flush with a rod that is used to form a hinge between the sleeve bodies.

The clamp wherein the clamp comprises a cylindrical shape, each sleeve body comprises longitudinal portions that are flat or concave in shape, and the longitudinal portions are located between respective rows of the inserts.

A clamp for a downhole tool, the clamp comprising:
a sleeve having an axis and sleeve bodies pivotally coupled together via a hinge on a first side, fasteners to mechanically lock the sleeve bodies together on a second side opposite the hinge to surround and clamp onto an exterior of a drill string, and a plurality of recesses formed in an exterior of each sleeve body; and inserts mounted in the recesses to provide low friction exterior surfaces for the clamp.

A clamp for a downhole tool, the clamp comprising:
a sleeve having an axis and sleeve bodies coupled together to mechanically lock the sleeve bodies together to surround and clamp onto an exterior of a drill string; and protrusions extending from the sleeve to provide low friction exterior surfaces for the clamp.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

What is claimed is:

1. A clamp for a downhole tool, the clamp comprising:
   a sleeve having an axis and sleeve bodies coupled together on a first side, fasteners to mechanically lock the sleeve bodies together on a second side, the sleeve is configured to surround and clamp onto an exterior of a drill string having pipes adjacent to coupled connections of the pipes, and a plurality of recesses formed in an exterior of each sleeve body; and
   inserts mounted in the recesses to provide low friction exterior surfaces for the clamp, wherein the inserts comprise at least one of polycrystalline diamond compacts (PDC), impregnated diamond or tungsten carbide, and at least at least some of the PDC are each mounted in respective steel rings.

2. The clamp of claim 1, wherein the sleeve does not add any axial length to the drill string, but surrounds only a portion of the drill string.

3. The clamp of claim 1, wherein the sleeve bodies are pivotally coupled together via a hinge.

4. The clamp of claim 1, wherein the sleeve bodies consist of metal and do not comprise a polymer or elastomer.

5. The clamp of claim 1, wherein the sleeve bodies comprise ceramic.

6. The clamp of claim 1 wherein, when the clamp is clamped onto the drill string, the clamp frictionally engages the drill string and never moves axially or rotationally with respect to the drill string during operation.

7. The clamp of claim 1, wherein the PDC are polished.

8. The clamp of claim 1, wherein at least some of the PDC are domed solids.

9. The clamp of claim 1, wherein at least some of the PDC are semi-spherical.

10. The clamp of claim 1, wherein said at least some of the PDC are in compression via the respective steel rings.

11. The clamp of claim 1, wherein the PDC are thermally stable and comprise a ceramic phase binder.

12. The clamp of claim 1, wherein the PDC are symmetrically arrayed about the sleeve.

13. The clamp of claim 1, wherein the PDC are not symmetrically arrayed about the clamp, having more PDC on one of the sleeve bodies than on another of the sleeve bodies.

14. The clamp of claim 1, wherein the PDC are not symmetrically arrayed about the sleeve, such that the sleeve has a higher density of PDC on one of the sleeve bodies than on another of the sleeve bodies.

15. The clamp of claim 1, wherein the PDC form rows and columns about the clamp.

16. The clamp of claim 1 wherein each PDC comprises a diameter in a range of 0.2 inches to ¾ inches.

17. The clamp of claim 1 wherein each PDC comprises a main axial length in a range of 0.2 inches to 1.5 inches.

18. The clamp of claim 1, wherein the PDC protrude beyond an exterior surface of the sleeve in a range of 0 inches to ½ inch.

19. The clamp of claim 1, wherein:
the clamp does not comprise ball bearings; and
the inserts do not comprise diamond carbide composite nor tungsten carbide.

20. The clamp of claim 1, wherein:
the clamp does not comprise an inclined ramp, other than at axial ends thereof;
the clamp does not comprise cutters or outer wear bands;
the clamp does not comprise axial flutes or grooves in the sleeve bodies between the inserts; and
the clamp is not threaded.

21. The clamp of claim 1, wherein each sleeve body comprises tapered axial ends.

22. The clamp of claim 21, wherein the tapered axial ends comprise a recess so that ends of the tapered axial ends are not flush with a rod that is used to form a hinge between the sleeve bodies.

23. The clamp of claim 1, wherein the clamp comprises a cylindrical shape, each sleeve body comprises longitudinal portions that are flat or concave in shape, and the longitudinal portions are located between respective rows of the inserts.

24. A clamp for a downhole tool, the clamp comprising:
a sleeve having an axis and sleeve bodies coupled together on a first side, fasteners to mechanically lock the sleeve bodies together on a second side to surround and clamp onto an exterior of a drill string having pipes adjacent to coupled connections of the pipes, and a plurality of recesses formed in an exterior of each sleeve body; and
inserts mounted in the recesses to provide low friction exterior surfaces for the clamp, wherein interior surfaces of the sleeve bodies comprise lower friction surfaces than other portions of the clamp to reduce friction directly between the sleeve bodies and the drill string and permit relative axial and/or rotational movement between the clamp and the drill string.

25. The clamp of claim 24, wherein the lower friction surfaces comprise PDC.

26. A clamp for a downhole tool, the clamp comprising:
a sleeve having an axis and sleeve bodies pivotally coupled together via a hinge on a first side, fasteners to mechanically lock the sleeve bodies together on a second side opposite the hinge to surround and clamp onto an exterior of a drill string, and a plurality of recesses formed in an exterior of each sleeve body; and
inserts mounted in the recesses to provide low friction exterior surfaces for the clamp, wherein the inserts comprise polycrystalline diamond compacts (PDC), and at least some of the PDC are each mounted in respective steel rings.

27. A clamp for a downhole tool, the clamp comprising:
a sleeve having an axis and sleeve bodies coupled together to mechanically lock the sleeve bodies together to surround and clamp onto an exterior of a drill string; and
protrusions extending from the sleeve to provide low friction exterior surfaces for the clamp, wherein interior surfaces of the sleeve bodies comprise lower friction surfaces than other portions of the clamp to reduce friction directly between the sleeve bodies and the drill string and permit relative axial and/or rotational movement between the clamp and the drill string, and the lower friction surfaces comprise PDC.

\* \* \* \* \*